(12) United States Patent
Angerpointner et al.

(10) Patent No.: US 9,673,892 B2
(45) Date of Patent: Jun. 6, 2017

(54) DEVICE FOR TRANSMITTING SIGNALS BETWEEN TWO ROTATABLE SUB-ASSEMBLIES

(71) Applicant: LTN Servotechnik GmbH, Otterfing (DE)

(72) Inventors: Ludwig Angerpointner, Munich (DE); Peter Autenzeller, Feldkirchen-Westerham (DE)

(73) Assignee: LTN SERVOTECHNIK GMBH, Otterfing (DE)

(*) Notice: Subject to any disclaimer, the term of this patent is extended or adjusted under 35 U.S.C. 154(b) by 125 days.

(21) Appl. No.: 14/180,839

(22) Filed: Feb. 14, 2014

(65) Prior Publication Data
US 2014/0224968 A1 Aug. 14, 2014

(30) Foreign Application Priority Data
Feb. 14, 2013 (EP) .................................. 13000776

(51) Int. Cl.
*G02B 6/36* (2006.01)
*H04B 10/00* (2013.01)
*H04B 10/80* (2013.01)

(52) U.S. Cl.
CPC ........... *H04B 10/00* (2013.01); *G02B 6/3604* (2013.01); *H04B 10/22* (2013.01); *H04B 10/801* (2013.01)

(58) Field of Classification Search
CPC ....... H04B 10/00; H04B 10/22; G02B 6/3604
USPC ................................. 250/214 R; 385/25, 26
See application file for complete search history.

(56) References Cited

U.S. PATENT DOCUMENTS

| | | | |
|---|---|---|---|
| 4,842,355 A | 6/1989 | Gold et al. | |
| 4,961,622 A * | 10/1990 | Gorman | G02B 3/04 359/708 |
| 5,828,146 A | 10/1998 | Lorenz et al. | |
| 6,353,693 B1 * | 3/2002 | Kano | G02B 6/3604 385/25 |
| 7,915,553 B2 * | 3/2011 | Arione | H03K 17/962 200/314 |
| 2007/0065158 A1 | 3/2007 | Shindou et al. | |
| 2008/0069495 A1 | 3/2008 | Hirohashi et al. | |
| 2012/0057818 A1 | 3/2012 | Zeiger et al. | |

FOREIGN PATENT DOCUMENTS

DE  44 28 790  2/1996

\* cited by examiner

*Primary Examiner* — Renee Chavez
(74) *Attorney, Agent, or Firm* — Andrews Kurth Kenyon LLP

(57) ABSTRACT

In a device for transmitting signals on two channels between two sub-assemblies rotatable relative to each other about an axis, a photodetector and a light source are connected via connecting lines to a receiver circuit and transmitter circuit. At least one of the connecting lines has a section extending with a radial directional component. The beam path of one channel extends with an axial directional component radially outside relative to the beam path of the optical signal of the other channel, past the section of the at least one connecting line.

14 Claims, 3 Drawing Sheets

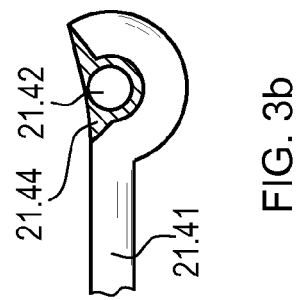
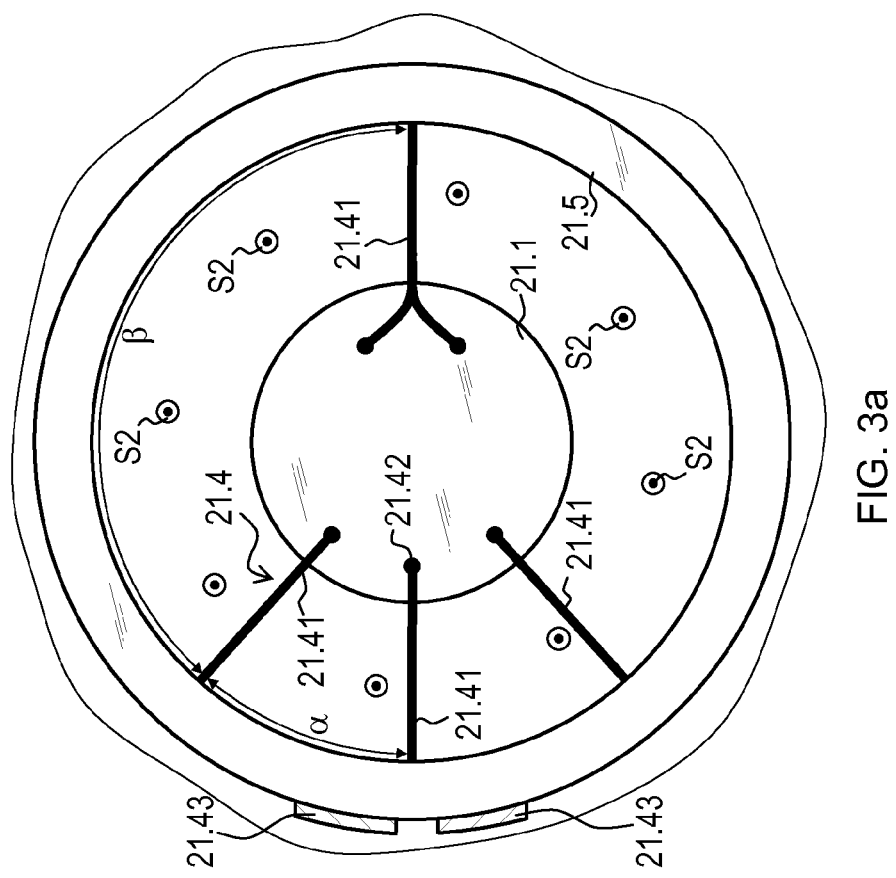

DEVICE FOR TRANSMITTING SIGNALS BETWEEN TWO ROTATABLE SUB-ASSEMBLIES

CROSS-REFERENCE TO RELATED APPLICATIONS

The present application claims priority to application No. 13 000 776.8, filed in the European Patent Office on Feb. 14, 2013, which is expressly incorporated herein in its entirety by reference thereto.

FIELD OF THE INVENTION

The present invention relates to a device for transmitting electrical signals between two sub-assemblies rotatable relative to each other.

BACKGROUND INFORMATION

Such sub-assemblies are frequently also referred to as rotor and stator. In these sub-assemblies, electrical signals are converted into optical signals and are supplied contactlessly via an air path to a photodetector, where they are converted into electrical signals again. Devices of this type are used in many technical fields for transmitting electrical signals from a stationary unit to a rotating electrical unit.

German Patent No. 44 28 790 describes a device for the bidirectional transmission of information, in which photoelectric receivers and transmitters are disposed eccentrically in relation to the axis of rotation.

SUMMARY

Example embodiments of the present invention provide a device for transmitting signals which allows very high transmission rates, and nevertheless is comparatively easy to manufacture.

According to example embodiments of the present invention, the device is used for transmitting signals on two channels between two sub-assemblies rotatable relative to each other about an axis. The first sub-assembly has a photodetector and an electronic receiver circuit, as well as at least one electric connecting line between the photodetector and the receiver circuit. The second sub-assembly has a light source (e.g., an LED or a laser diode) and an electronic transmitter circuit, as well as at least one electric connecting line between the light source and the transmitter circuit. Furthermore, the at least one electric connecting line of the first sub-assembly or of the second sub-assembly has at least one section extending with a radial directional component. Alternatively, both the at least one electric connecting line of the first sub-assembly and the at least one electric connecting line of the second sub-assembly may have at least one section extending with a radial directional component. To transmit an electrical signal on a first channel, this electrical signal is convertible by the transmitter circuit and the light source into an optical signal. This optical signal is convertible by the photodetector and the receiver circuit into an electrical signal again. A further optical signal is transmittable on a second channel. The device is configured such that the beam path of the second channel propagates with an axial directional component, and in addition, extends radially outside relative to the beam path of the optical signal of the first channel. At the same time, the beam path of the optical signal of the second channel extends past the section of the at least one electric connecting line extending with a radial directional component.

A connecting line should be understood to be an electric line which is suitable for connecting two electrical or electronic components or circuits to each other.

In order to transmit signals on the first channel, the light source and the photodetector are disposed coaxially relative to the axis about which the sub-assemblies are rotatable. Accordingly, the light source and the photodetector are positioned geometrically such that they are intersected by the axis. In particular, a line of symmetry of the beam path of the optical signal of the first channel may be congruent with the axis or identical to the axis. The device may be configured such that the beam path of the optical signal of the first channel extends coaxially and concentrically with respect to the axis.

The receiver circuit or the transmitter circuit or both may be disposed with a greater distance from the axis than the distance of the light source from the axis. Alternatively or additionally, the receiver circuit or the transmitter circuit or both may be disposed with greater distance from the axis than the distance of the photodetector from the axis. In other words, the receiver circuit or the transmitter circuit or both may be disposed with a radial offset (radially outside) relative to the light source and/or the photodetector. For the preferred case, that the middle of the light source or of the photodetector is located on the axis about which the sub-assemblies are rotatable, the distance of the light source or of the photodetector from the axis has the value zero.

Thus, the receiver circuit and/or the transmitter circuit for transmitting signals on the first channel may be disposed radially outside relative to the beam path of the optical signal of the first channel, that is, may be radially offset relative to the beam path of the optical signal of the first channel. In particular, the device may be configured such that the light source and the photodetector are intersected by the axis, while the receiver circuit and/or the transmitter circuit for transmitting signals on the first channel may not be intersected by the (rotational) axis. The receiver circuit and/or the transmitter circuit may thus be disposed in the device such that they are located outside of an area which may be regarded as extension of the beam path of the optical signal of the first channel.

The electric connecting line may be implemented such that it is also used for the mechanical fixation or mounting support of the light source or of the photodetector.

Furthermore, the at least one electric connecting line may be contacted to a pin of the light source or to a pin of the photodetector.

The section of the electric connecting line extending with a radial directional component may be connected to a printed circuit board which is located radially outside relative to the at least one electric connecting line. For example, the printed circuit board in question may be in the form of a ring segment or have the shape of a closed ring.

For transmission on the second channel, the first sub-assembly may have a further light source and a further electronic transmitter circuit connected to it. The second sub-assembly then has a further photodetector and a further electronic receiver circuit connected to it.

Alternatively, the first sub-assembly may likewise have the further photodetector and the further electronic receiver circuit connected to it. In this case, the second sub-assembly may then include the further light source and the further electronic transmitter circuit connected to it.

For transmission on the second channel, the first sub-assembly may have a first optical element and the second sub-assembly may have a second optical element. One of the optical elements (the first or the second) may be disposed axially between the further light source (for the second channel) and the photodetector which is intended for the transmission on the first channel. Alternatively or additionally, to transmit on the second channel, the first sub-assembly may have the first optical element and the second sub-assembly may have the second optical element. One of the optical elements (the first or the second) may be disposed axially between the further light source (for the second channel) and the light source which is intended for the transmission on the first channel.

For transmission on the second channel, the first sub-assembly may have a first optical element and the second sub-assembly may have a second optical element, one of the optical elements being disposed axially between the further photodetector and the photodetector which is intended for the transmission on the first channel, or the light source which is intended for the transmission on the first channel.

The first and/or the second optical element may be implemented as a convex lens. In particular, the first or the second optical element or both optical elements may be implemented as a plano-convex lens. Alternatively, achromatic lenses may also be used, for example.

The light source which is intended for the transmission on the first channel, and the further light source which is intended for the transmission on the second channel may be disposed coaxially relative to the axis. In the same manner, the photodetector which is intended for the transmission on the first channel, as well is the further photodetector which is intended for the transmission on the first channel may be disposed coaxially relative to the axis. Therefore, the light source which is intended for the transmission on the first channel, the further light source which is intended for the transmission on the second channel, the photodetector which is intended for the transmission on the first channel, and the further photodetector which is intended for the transmission on the first channel may thus be positioned such that they are all intersected by the (rotational) axis. In particular, their centers (in terms of the optical functions in question) may be intersected by the (rotational) axis.

The first sub-assembly may have a third optical element and the second sub-assembly may have a fourth optical element for forming the beam path of the optical signal of the first channel. The third and the fourth optical element may be implemented as lenses.

The receiver circuit and/or the transmitter circuit (in each case for the transmission on the first channel) may be disposed with a radial offset, e.g., displaced radially toward the outside, relative to the light source (for the transmission on the first channel), the photodetector (for the transmission on the first channel), the first optical element (for the transmission on the second channel) and the second optical element (for the transmission on the second channel).

Furthermore, the receiver circuit and/or the transmitter circuit (in each case for the transmission on the first channel) may be disposed with a radial offset, e.g., may be displaced radially toward the outside, relative to the third optical element (for the transmission on the first channel) and the fourth optical element (for the transmission on the first channel).

The device may be arranged such that the optical axis of the optical signal for transmission on the first channel and the optical axis of the optical signal for transmission on the second channel are identical. In particular, these optical axes may be congruent with the axis about which the sub-assemblies are rotatable relative to each other.

Using the device described herein, it is possible to transmit signals having high quality, so that extremely high data rates on the order of 10 Gbps or more are attainable.

Further features and aspects of example embodiments of the present invention are described in more detail below with reference to the appended Figures.

BRIEF DESCRIPTION OF THE DRAWINGS

FIG. 3a is an enlarged detail view of the mounting of a light source.

FIG. 3b is an enlarged detail view of a connecting line.

DETAILED DESCRIPTION

Figure 1:
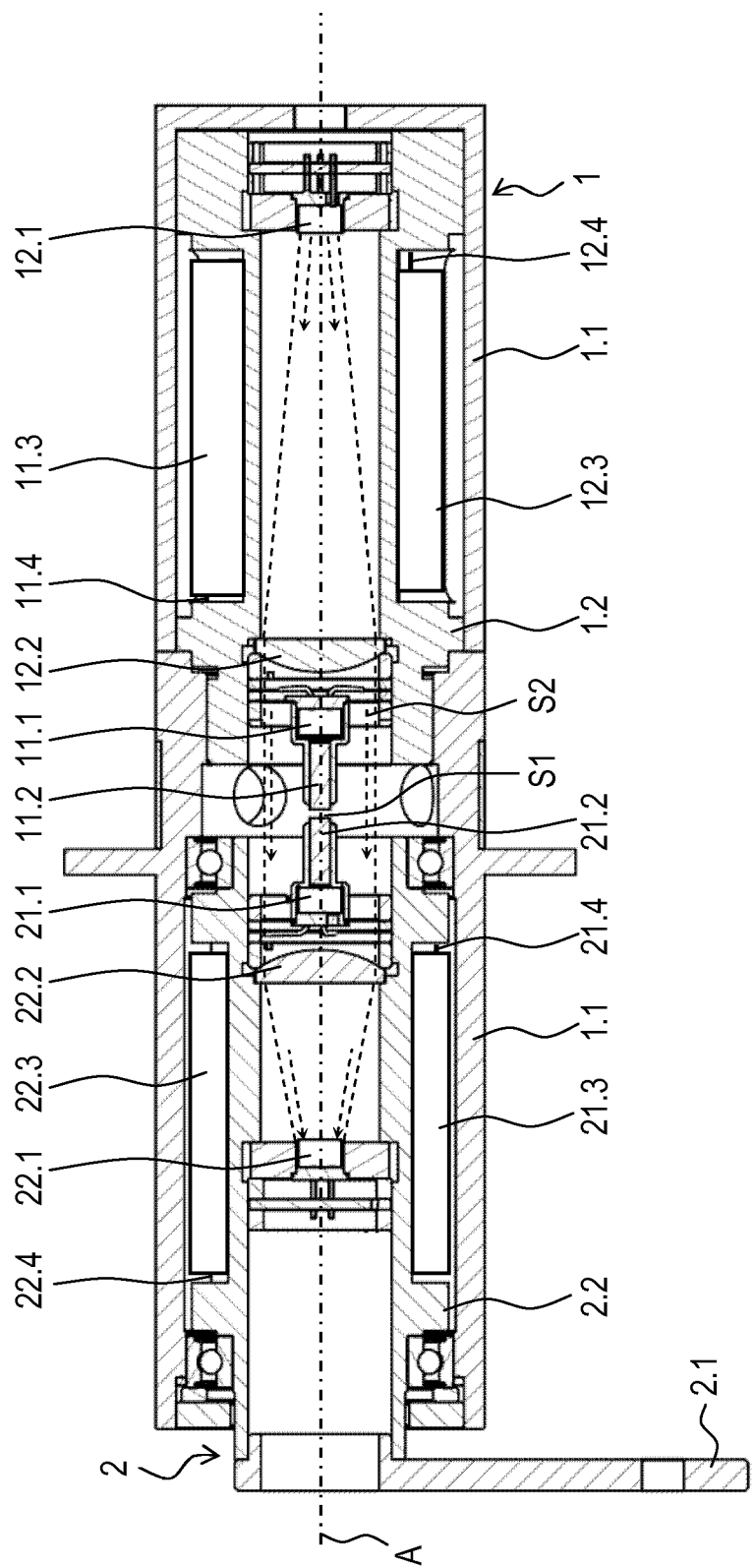
FIG. 1 is a longitudinal cross-sectional view of a device for transmitting signals on two channels.

As illustrated in FIG. 1, a device according to an example embodiment of the present invention includes a first sub-assembly which may be denoted as rotor 1 and a second sub-assembly, referred to hereinafter as stator 2. The device is used to transmit electrical signals with a high transmission rate between rotor 1 and stator 2, rotor 1 and stator 2 being disposed in a manner allowing rotation relative to each other about an axis A. Stator 2 is supported relative to rotor 1 by rolling-contact bearings 3.

Rotor 1 has a housing 1.1 which is generally tubular. Within this housing 1.1 is a holder 1.2 on the rotor side, that has recesses or pockets in which printed circuit boards are disposed. An electronic receiver circuit 11.3 is mounted on one of the printed circuit boards, and an electronic transmitter circuit 12.3 is mounted on another printed circuit board. Also located on holder 1.2 is a photodetector 11.1 that is in contact electrically with receiver circuit 11.3 via a connecting line 11.4. Analogously, a light source 12.1 on the rotor side is connected electrically to transmitter circuit 12.3 via a connecting line 12.4. The light emittable by light source 12.1 is able to be collimated by a lens 12.2 likewise mounted on holder 1.2. In addition, a further lens 11.2 is disposed on photodetector 11.1. Holder 1.2 is produced in one piece, so that the elements mounted on it, particularly light source 12.1, lens 12.2 and photodetector 11.1 may be positioned exactly relative to each other in a comparatively easy manner.

Located in housing 1.1 of rotor 1, which is rotatable with the aid of rolling-contact bearings 3, is a holder 2.2 on the stator side. Stator-side holder 2.2 also has recesses or pockets in which printed circuit boards are located. A stator-side electronic transmitter circuit 21.3 is mounted on one of the printed circuit boards, while a stator-side electronic receiver circuit 22.3 is situated on another printed circuit board. A torque support 2.1 is also attached to holder 2.2. Further mounted on holder 2.2 is a photodetector 22.1 that is in contact electrically with receiver circuit 22.3 via a connecting line 22.4. Analogously, a light source 21.1 is connected electrically to transmitter circuit 21.3 via a connecting line 21.4. The light emittable by light source 21.1 is able to be collimated by a lens 21.2. Holder 2.2 is also produced in one piece, so that the elements mounted on it, particularly photodetector 22.1, lens 21.2 and light source 21.1 may be positioned exactly relative to each other in comparatively easy manner.

In the present exemplary embodiment, lenses 12.2, 22.2 are each collimator lenses implemented as plano-convex lenses. In each case a further lens 11.2, 21.2, illustrated, for example, as a GRIN lens, is disposed on photodetector 11.1 and light source 21.1. Alternatively, achromatic lenses may also be provided, for example.

The device is used for the bidirectional transmission of electrical signals on two channels between rotor 1 and stator 2. In order to transmit the signals on a first channel, first of all, these signals, together with an electric current for the power supply, are fed via a cable into transmitter circuit 21.3. There, the signals are conditioned appropriately and supplied, together with the electric current, via connecting line 21.4 to light source 21.1. Light source 21.1, which in the exemplary embodiment described, is in the form of a laser diode, emits light, so that the electrical signal is thus converted by transmitter circuit 21.3 and by light source 21.1 into an optical signal. Beam path S1 (see FIG. 2) of the optical signal of the first channel is collimated by lens 21.2.

Lens 11.2 on rotor 1 is set apart with axial clearance from the lens 21.2 on the stator side. The optical signal of the first channel is supplied by lens 11.2 to photodetector 11.1. Photodetector 11.1 is in electrical contact with receiver circuit 11.3 via connecting line 11.4. Photodetector 11.1 and receiver circuit 11.3 convert the optical signal into an electrical signal which, with the aid of a cable, is transmitted to a component rotating relative to stator 1.

Connecting lines 11.4, 21.4 each have a radial section 11.41, 21.41. They are represented, for example, in FIG. 3a, using the electrical connection of light source 21.1 as example. Radial sections 11.41, 21.41 are implemented as wires oriented in the radial direction. In the exemplary embodiment illustrated, the wires have a thickness of 0.2 mm. Both photodetector 11.1 and light source 21.1 of the first channel have pins 11.42, 21.42, which may be denoted as sections of connecting lines 11.4, 21.4 oriented in the axial direction. The radially inner ends of radial sections 11.41, 21.41 are joined to pins 11.42, 21.42 by a soldered connection.

The other ends of radial sections 11.41, 21.41, e.g., the radially outer ends, are connected electrically to printed conductors on ring-shaped printed circuit boards 21.5, 11.5. The contacting points of the radially outer ends of radial sections 11.41, 21.41 are staggered in the circumferential direction, so that a stiff mechanical connection of photodetector 11.1 and light source 21.1 is achieved. In this connection, the contact points may be set apart from each other with an angular offset $\alpha$, $\beta$ of at least 20°, that is to say, if radial sections 11.41, 21.41 are aligned divergently relative to each other at an angle $\alpha$, $\beta$ of at least 20°.

The printed conductors extend along the circumferential direction in conformance with the shape of the printed circuit board. The ends of the printed conductors are connected electrically to multicore flexible conductors 21.43. Flexible conductors 21.43 lead to transmitter circuit 21.3 and are electrically contacted to it. Thus, connecting line 21.4 on the stator side includes flexible conductors 21.43, radial sections 21.41 and pins 21.42. Analogously, connecting line 11.4 on the rotor side then likewise includes flexible conductors, radial sections 11.41 and pins 11.42.

Pins 11.42, 21.42 and radial sections 11.41, 21.41 of connecting lines 11.4, 21.4 are thus used for the electrical connection of light source 21.1 and photodetector 11.1 of the first channel, but also for the mechanical mounting of light source 21.1 and photodetector 11.1, respectively. In order that this mechanical mounting will at the same time ensure optimal coaxial alignment of light source 21.1 and photodetector 11.1 and associated lenses 11.2, 21.2, a special joining technique is used. FIG. 3b shows an enlarged detail view of the contact point between a radial section 21.41 and a pin 21.42, for example. In the course of assembly, first of all, the radially inner end of radial section 21.41 of connecting line 21.4 in the form of an eye is placed such that pin 21.42 is surrounded by it. In so doing, there is no contact between pin 21.42 and the end of radial section 21.41. Initially, all radial sections 21.41 are disposed in the same manner in the vicinity of pins 21.42 of light source 21.1. The clearance between pin 21.42 and the end of radial section 21.41 is dimensioned to be great enough that even upon subsequent alignment or adjustment, no contact will take place, so that a relative movement, stress-free from the mechanical standpoint, between these parts is possible during the adjustment. Light source 21.1 is aligned such that its beam path S1 extends coaxially parallel to axis A with minimal tolerance deviation. Pins 21.42 of light source 21.1 are subsequently soldered to the radially inner ends of radial sections 21.41. Accordingly, solder 21.44 fills in the gap between pins 21.42 and the ends of radial sections 21.41, without pins 21.42 and the ends of radial sections 21.41 touching each other. Mechanical prestressing as a result of the alignment may therefore be avoided.

After photodetector 11.1 has been adjusted, pins 21.42 are also soldered on the rotor side to radial sections 11.41 of connecting lines 12.4 according to the same principle, in order to achieve an electrical connection of photodetector 11.1, and at the same time, precise coaxial alignment of photodetector 11.1 with lens 11.2.

Figure 2:
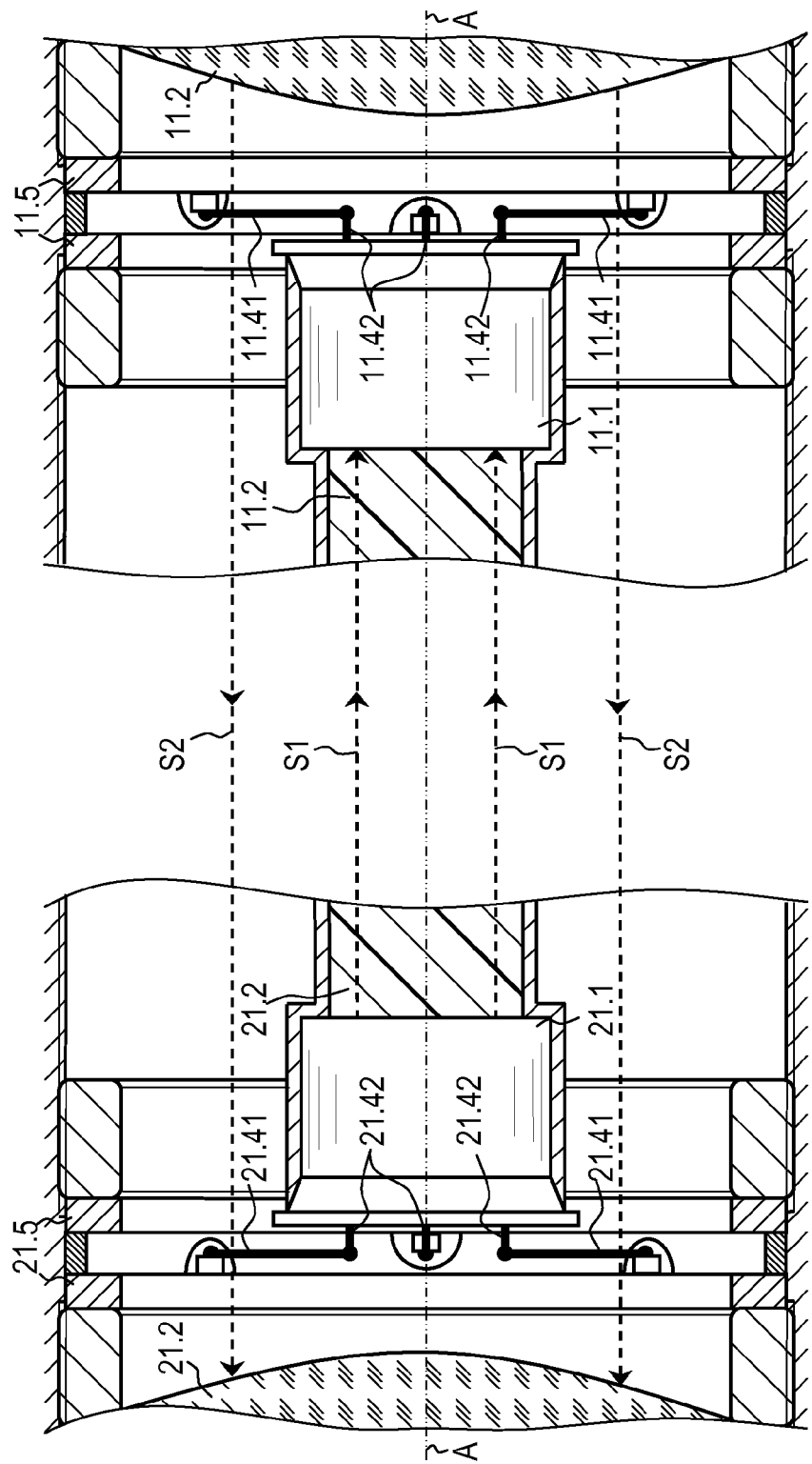
FIG. 2 is an enlarged detail view of components for the transmission of signals.

In the exemplary embodiment illustrated, signal transmission on a second channel proceeds in the opposite direction in relation to the signal transmission on the first channel, as illustrated in FIG. 2, for example. Accordingly, in order to transmit signals on a second channel, first of all, these signals, together with an electric current for the power supply, are fed via a cable into rotor-side transmitter circuit 12.3. There, the signals are conditioned appropriately and supplied, together with the electric current, via connecting line 12.4 to light source 12.1. Light source 12.1, which in the exemplary embodiment described, is likewise in the form of a laser diode, emits light, so that the electrical signal is thus converted into a further optical signal by transmitter circuit 12.3 and by light source 12.1. Beam path S2 of the optical signal of the second channel is collimated by plano-convex lens 12.2. Thus, after transiting lens 12.2, beam path S2 extends in the axial direction, parallel to axis A (see, for example, FIG. 2). Furthermore, beam path S2 for transmitting signals on the second channel extends radially outside relative to beam path S1 of the first channel. In addition, beam path S2 extends past sections 11.41, 21.41 of connecting lines 11.4, 21.4, see also the representation in FIG. 3a where, for example, arrows are drawn in the top view for beam path S2. Beam path S2 is then focused by lens 22.2 on the stator side, so that the optical signal of the second channel is supplied to photodetector 22.1. Photodetector 22.1 is in electrical contact with receiver circuit 22.3 via connecting line 22.4. Photodetector 22.1 and receiver circuit 22.3 convert the optical signal into an electrical signal which, with the aid of a cable, is transmitted to a non-rotating component.

Both the optical elements of the first channel (light source 21.1, lens 21.2, photodetector 11.1 and lens 11.2) as well as the optical elements of the second channel (further light source 12.1, lens 12.2, further photodetector 22.1 and lens 22.2) are disposed coaxially relative to axis A. Therefore, the optical axis of the optical signals of the first channel is congruent with respect to the optical axis of the optical signals of the second channel. Furthermore, the device has an area in which first beam path S1 (first channel) has a cylindrical shape, and second beam path S2 (second channel) extends concentrically and radially outside of first beam path S1. In particular, second beam path S2 may have a hollow cylindrical shape.

Transmitter circuits 21.3, 12.3 and receiver circuits 11.3, 22.3 are disposed with radial offset, e.g., are displaced radially toward the outside, in relation to light source 21.1, lens 21.2, photodetector 11.1, lens 11.2, further light source 12.1, lens 12.2, further photodetector 22.1 and lens 22.2.

Among other things, this type of construction brings with it the advantage of permitting an extremely robust system in terms of electromagnetic disturbances, so that very high transmission rates are attainable. The shadowing caused by radial sections 11.41, 21.41 of connecting lines 11.4, 21.4 is of minor importance for the transmission rates. Electrical signals may be fed into one sub-assembly and tapped at the other sub-assembly in the device and vice versa. According to the exemplary embodiment described above, the conversion into optical signals and the conversion back into electrical signals take place within the device.

What is claimed is:

1. A device, comprising:
    a first sub-assembly including a photodetector, an electronic receiver circuit, and at least one connecting line between the photodetector and the receiver circuit; and
    a second sub-assembly including a light source, an electronic transmitter circuit, and at least one connecting line between the light source and the transmitter circuit, the first sub-assembly and the second sub-assembly being rotatable relative to each other about an axis;
    wherein the at least one connecting line of the first sub-assembly and/or of the second sub-assembly includes at least one section extending with a radial directional component, the connecting line including a wire and mechanically fixing the light source and/or the photodetector;
    wherein, for transmission of an electrical signal on a first channel, the transmitter circuit and the light source are adapted to convert the electrical signal into an optical signal, and the photodetector and the receiver circuit are adapted to convert the optical signal back into an electrical signal;
    wherein, on a second channel, a further optical signal is transmittable, the further optical signal having a beam path with an axial directional component radially outside of a beam path of the optical signal of the first channel, past the section of the at least one connecting line extending with a radial directional component; and
    wherein, for transmission on the second channel:
        a) the first sub-assembly includes a further light source and a further electronic transmitter circuit connected to the further light source, and the second sub-assembly includes a further photodetector and a further electronic receiver circuit connected to the further photodetector; or
        b) the first sub-assembly includes a further photodetector and a further electronic receiver circuit connected to the further photodetector, and the second sub-assembly includes a further light source and a further electronic transmitter circuit connected to the further light source.

2. The device according to claim 1, wherein the light source and the photodetector are intersected by the axis.

3. The device according to claim 1, wherein the receiver circuit and/or the transmitter circuit is located at a greater distance from the axis than the light source or the photodetector.

4. The device according to claim 1, wherein the at least one connecting line is connected to a pin of the light source and/or of the photodetector.

5. The device according to claim 1, wherein the section of the at least one connecting line extending with the radial directional component is connected to a printed circuit board located radially outside relative to the at least one connecting line.

6. The device according to claim 1, wherein the first sub-assembly includes a first optical element and the second sub-assembly includes a second optical element, one of the optical elements being located axially between the further light source and the photodetector for the first channel or the light source for the first channel.

7. The device according to claim 6, wherein the first optical element and/or the second optical element is arranged as a convex lens.

8. The device according to claim 6, wherein the receiver circuit and/or the transmitter circuit is located with a radial offset relative to the light source, the photodetector, the first optical element, and the second optical element.

9. The device according to claim 1, wherein the first sub-assembly includes a first optical element and the second sub-assembly includes a second optical element, one of the optical elements being located axially between the further photodetector and the photodetector for the first channel or the light source for the first channel.

10. The device according to claim 9, wherein the first optical element and/or the second optical element is arranged as a convex lens.

11. The device according to claim 10, wherein the first optical element and/or the second optical element is arranged as a plano-convex lens.

12. The device according to claim 1, wherein the light source, the further light source, the photodetector, and the further photodetector are arranged coaxially relative to the axis.

13. The device according to claim 1, wherein the first sub-assembly includes a third optical element and the second sub-assembly includes a fourth optical element for forming a beam path of the optical signal of the first channel.

14. The device according to claim 13, wherein the receiver circuit and/or the transmitter circuit is arranged with a radial offset relative to the third optical element and the fourth optical element.

* * * * *